United States Patent [19]

Le Gloan

[11] Patent Number: 5,628,377
[45] Date of Patent: May 13, 1997

[54] GOODS-HANDLING CART WITH STABILIZING WHEELS

[75] Inventor: André Le Gloan, Argentan Cedex, France

[73] Assignee: M I C, Societe Anonyme, France

[21] Appl. No.: 491,125

[22] Filed: Jun. 16, 1995

[51] Int. Cl.⁶ .................................................. B62D 61/00
[52] U.S. Cl. ........................... 180/21; 16/18 B; 180/22; 180/24; 180/209; 280/43.12; 280/43.13; 280/724; 280/688; 280/755; 403/16
[58] Field of Search ...................... 16/18 B, 33; 403/1, 403/16; 180/21, 22, 24, 209; 280/293, 304, 755, 767, 43.12, 43.13, 86, 688, 47.16, 47.2, 724

[56] References Cited

U.S. PATENT DOCUMENTS 4,453,613  6/1984  Gebelius ........................... 280/43.12

FOREIGN PATENT DOCUMENTS

| 0556543 | 8/1993 | European Pat. Off. . |
| 615980 | 1/1927 | France .................................. 280/688 |
| 1087419 | 8/1955 | France . |
| 2606765 | 5/1988 | France . |
| 2667546 | 4/1992 | France . |
| 2117336 | 10/1983 | United Kingdom .................. 280/293 |

Primary Examiner—Eric D. Culbreth
Attorney, Agent, or Firm—Dvorak and Traub

[57] ABSTRACT

This invention relates to a goods-handling cart having chassis provided with a drive and steer wheel together with two swivelling stabilizing wheels, and at least one spring-effect element which acts on both of the stabilizing wheels via a mechanism that transmits a downwardly-directed vertical force to the stabilizing wheels, the mechanism is not attached to the wheels but merely bears thereagainst via simple contact surfaces engaging respective mounting elements for mounting the wheels in such a manner that the mechanism is free to move away from one or other of the mounting elements in a direction opposite to the direction in which the spring-effect element acts; retaining mechanism being associated with each wheel to limit displacement thereof in a downwards direction relative to the chassis.

7 Claims, 4 Drawing Sheets

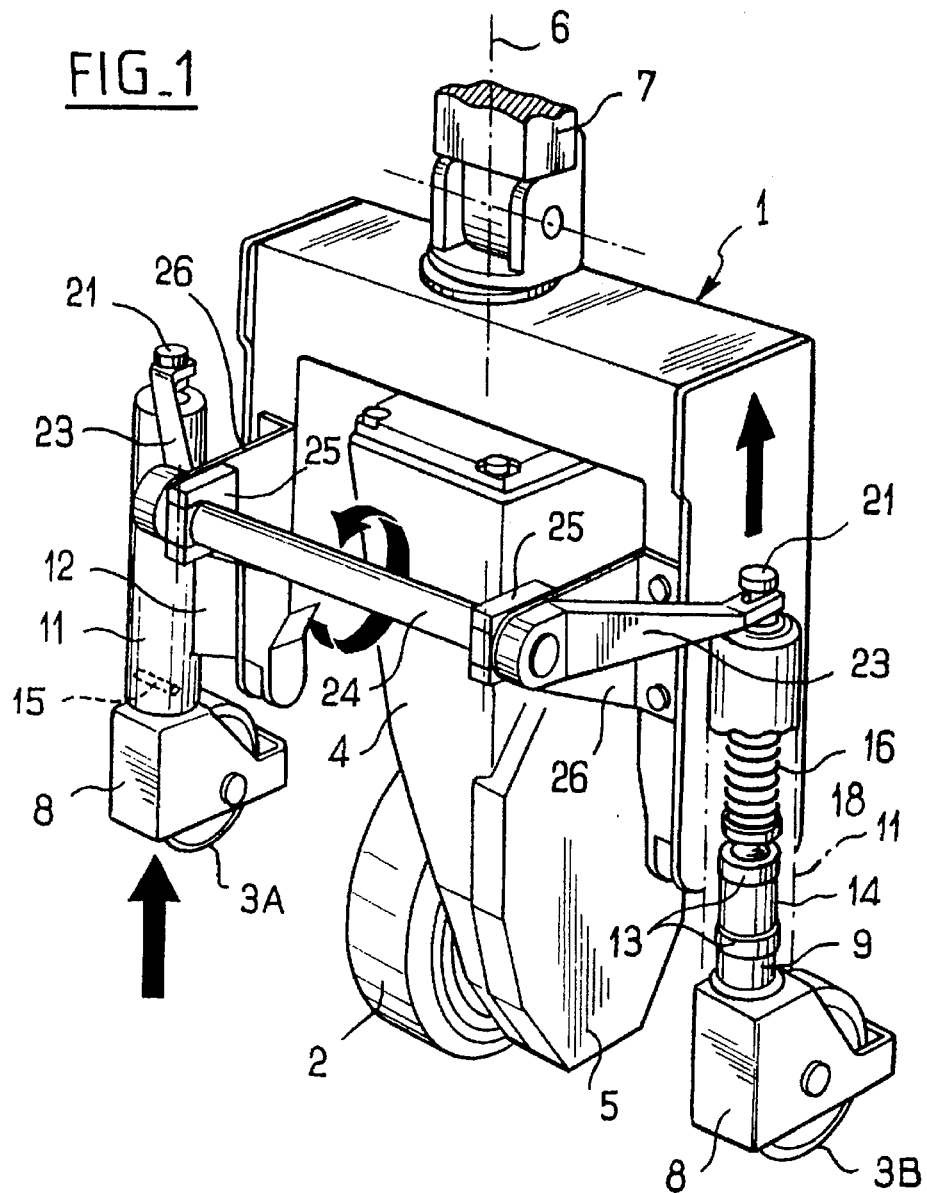
FIG_1
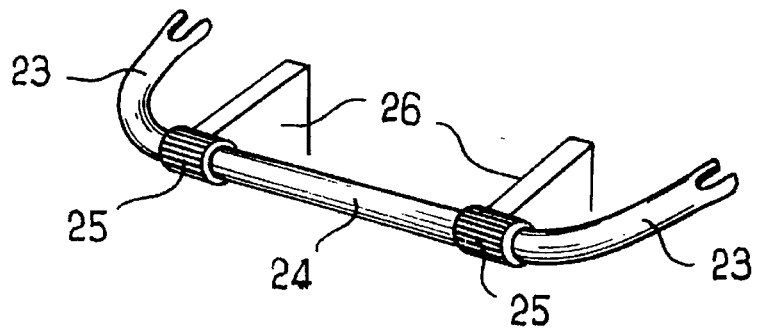
FIG_2

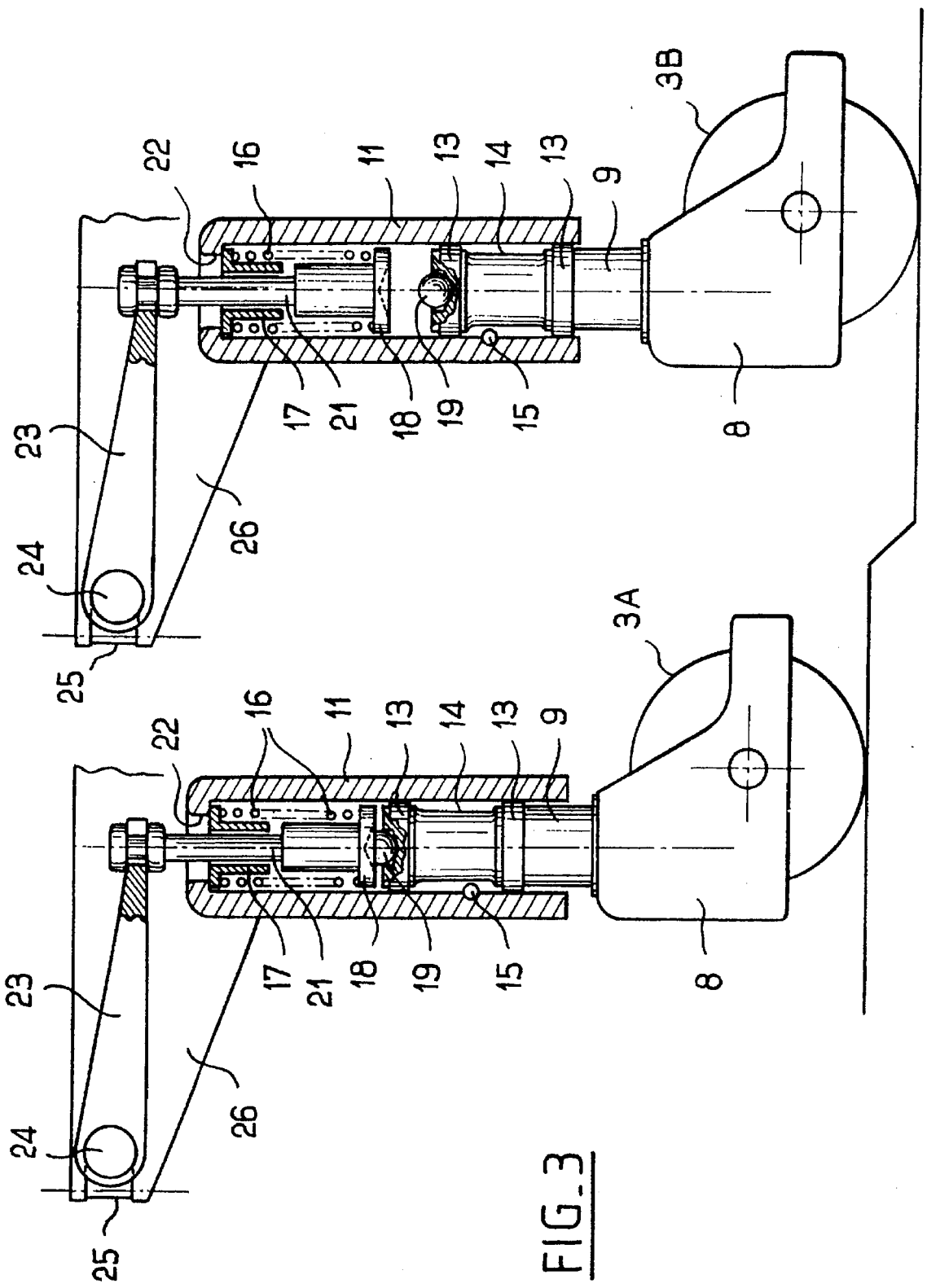
FIG_3

1

GOODS-HANDLING CART WITH STABILIZING WHEELS

FIELD OF THE INVENTION

The present invention relates to a goods-handling cart comprising a chassis provided with a plurality of wheels enabling it to run on the ground, one of the wheels being a drive and steer wheel and being situated in the longitudinal midplane of the cart, two other wheels being swivelling stabilizing wheels situated on respective opposite sides of the drive and steer wheel, each stabilizing wheel being mounted both to pivot about a vertical axis and to move vertically relative to the chassis, and in which at least one spring-effect element acts on both stabilizing wheels via a mechanism which includes two levers that are interconnected by an anti-roll bar, and which transmits a downwardly-directed vertical force to said stabilizing wheels.

BACKGROUND OF THE INVENTION

In known goods-handling carts of this type, a single spring-effect element may be provided, as described in French patent No. 2 667 546, or two spring-effect elements may be provided which are located above respective ones of the stabilizing wheels, as is the case, for example, in the goods-handling carts sold by the company: BT (AKTIEBOLAGET BYGG-OCH TRANSPORTEKONOMI). In those known carts, each of the two stabilizing wheels is attached to a respective one of the two levers situated at the ends of the anti-roll bar. Under such conditions, when the cart leans to one side during a turn or on an inclined slope or indeed when tilted because of its load, the stabilizing wheel situated on the side towards which the cart is leaning exerts upwards vertical thrust on the associated lever. This vertical thrust has the effect of rotating the anti-roll bar about its longitudinal axis in its support bearings. As a result the spring-effect element(s), e.g. helical springs, are compressed, and the lever associated with the opposite stabilizing wheel, i.e. the wheel on the side that is opposite from the side towards which the cart is leaning, also rotates with the anti-roll bar. Consequently said opposite stabilizing wheel rises and looses contact with the ground. Thus, it is no longer steered by its contact with the ground and since it is free to swivel, it can swivel into any orientation while it is no longer in contact with the ground. Consequently, when the cart returns to its normal position, at the instant the stabilizing wheel regains contact with the ground, it may be oriented perpendicularly to the travel direction of the cart. Should that happen, the swivelling wheel or the elements mounting it on the chassis of the cart can be subjected to considerable damage.

OBJECTS AND SUMMARY OF THE INVENTION

An object of the present invention is to remedy this drawback.

To this end, the invention provides a goods-handling cart of the type mentioned above, wherein said mechanism is not attached to the stabilizing wheels, but merely bears against them via simple contact surfaces acting on respective mounting elements for the stabilizing wheels such that said mechanism is free to move away from said corresponding stabilizing wheel mounting elements in a direction opposite to the thrust direction of said spring-effect element, and wherein retaining means are associated with each stabilizing wheel to restrict downwards displacement thereof relative to the chassis.

Under such conditions, when one of the two stabilizing wheels urges one of the two levers of the anti-roll bar upwards, the other lever moves away from the other stabilizing wheel which then remains in contact with the ground, and which consequently continues to be steered by its contact with the ground. Both stabilizing wheels therefore continue to retain proper orientation and the above-mentioned drawbacks are avoided.

BRIEF DESCRIPTION OF THE DRAWINGS

Other characteristics and advantages of the present invention appear from the following description of various embodiments of the invention given by way of example and described with reference to the accompanying drawings, in which:

FIG. 1 is a perspective view showing the front axle assembly of a goods-handling cart of the present invention, with only a small portion of the chassis of the cart being shown;

FIG. 2 is a perspective view showing a variant embodiment of the anti-roll bar used in the cart of FIG. 1;

FIG. 3 is a view that is partially in section and partially in elevation, and it shows the two stabilizing wheels of the FIG. 1 cart, illustrating one possible situation for the two wheels;

MORE DETAILED DESCRIPTION

Figure 5:
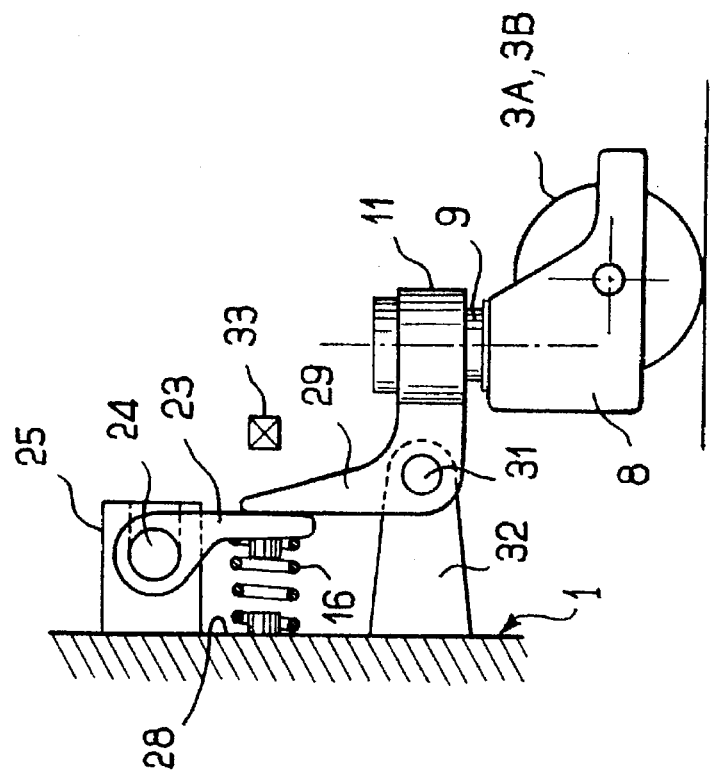
FIG. 5 is a diagrammatic view showing another variant embodiment of the invention.

A goods-handling cart of the present invention may be a cart of the "hand-powered pallet fork" kind or of the "pallet stacker" kind, and it may be of the type having a driver riding thereon, such as the cart described in French patent No. 2 667 546, or of the type having an accompanying driver, i.e. a driver walking beside the cart. As shown in FIG. 1, carts of this kind have a chassis 1 having a fork (not shown in FIG. 1) mounted on one side thereof, with both prongs of the fork extending generally horizontally from the bottom portion of the chassis 1. At its free end, each of the prongs of the fork rests on the ground via at least one roller (not shown). In well-known manner, the fork is generally movably mounted relative to the chassis 1 so as to be capable of being lowered and raised in order to engage a load, e.g. a pallet.

As shown in FIG. 1, the chassis 1, which may be in the form of an upsidedown U-shape, for example, rests on the ground via three wheels. These wheels constitute the front wheels of the cart and they comprise a central wheel 2 which is used both for driving and for steering purposes, together with two swivelling stabilizing wheels 3A and 3B which are mounted on either side of the wheel 2.

The wheel 2 is mounted to rotate in a wheel support 4 which also carries a drive unit 5 suitable for rotating the wheel 2. The drive unit 5 may be constituted, for example, by a hydraulic motor or by a motor and gear unit that is electrically driven. The wheel support 4 is mounted to pivot relative to the chassis 1 about a vertical axis represented diagrammatically in FIG. 1 by chain-dotted line 6. In conventional manner, a steering linkage 7 (shown in part in FIG. 1) is connected to the wheel support 4 via the top end of its vertical pivot axis and enables the driver of the cart to steer the wheel 2 in the desired travel direction.

Each of the stabilizing wheels 3 is mounted to rotate in a clevis 8 which is itself provided with a vertical pivot 9 that is mounted both to slide and to rotate in a vertical axis cylindrical housing 11 that is rigidly fixed to the chassis 1, either directly or via an appropriate mount, such as the mount shown diagrammatically at 12 in FIG. 1.

As can be seen more clearly in FIG. 3, the pivot 9 for each of the two stabilizing wheels 3A and 3B carries two spaced-apart anti-friction rings 13 enabling it to slide axially and to rotate in the inside bore of the cylindrical housing 11. A wide groove 14 is formed in the cylindrical surface of each pivot 9 and extends between the two rings 13. A pin 15 engaged in a hole formed through the cylindrical wall of the housing 11 projects into the inside bore of the housing 11 and engages in the groove 14o The groove 14 and the pin 15 together form the means that limit axial displacements of the pivot 9 in both directions, thereby preventing the corresponding stabilizing wheel 3A or 3B from being lost whenever the chassis 1 is lifted off the ground.

Figure 6:
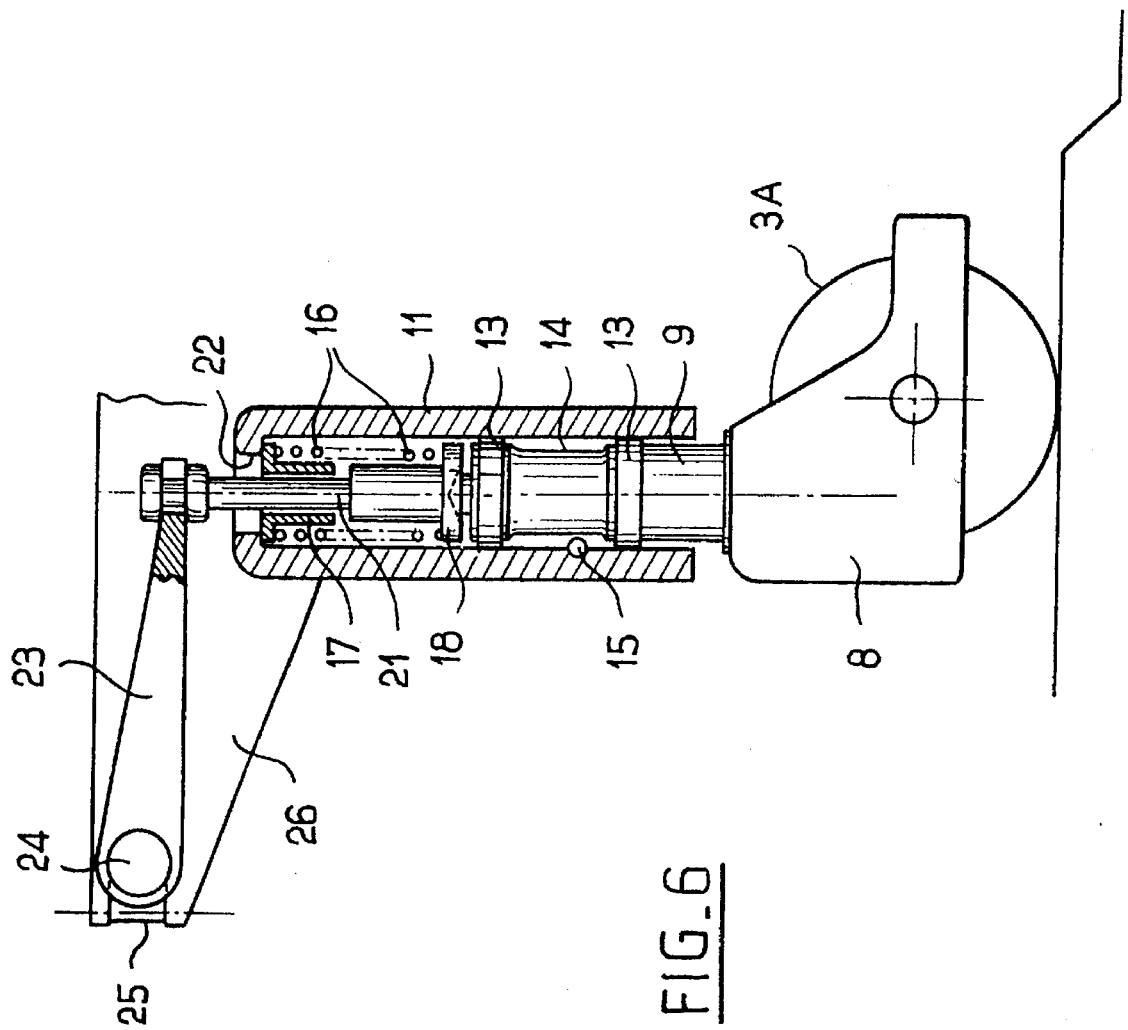
FIG. 6 is a view similar to FIG. 3, but showing only one stabilizing wheel lacking an anti-friction element.

As can also be seen in FIG. 3, the cylindrical housing 11 for each pivot 9 is at least partially closed at its top end so as to form a thrust surface for one of the ends of a helical spring 16. As shown in FIG. 3, the top end of the helical spring 16 does not bear directly against the top end wall of the cylindrical housing 11, but bears against the flange of a cylindrical centering and guide part 17 for the helical spring 16, which part in turn bears against the top end wall of the housing 11. The other or bottom end of the helical spring 16 bears against a pusher 18 which, under thrust from the helical spring 16, exerts a vertical thrust force on the top end of the pivot 9 of the corresponding stabilizing wheel 3A or 3B. In order to avoid interfering with rotary movements of the pivots 9, it is preferable to interpose anti-friction elements 19 between each pivot 9 and the pusher 18 that is associated therewith. The anti-friction elements may be omitted (see FIG. 6). By way of example, the anti-friction elements 19 may be constituted by respective balls received in part in a conical or spherical recess formed in the top end face of the pivot 9, and in part in a conical or spherical recess formed in the bottom end face of the pusher 18.

Each pusher 18 is provided with a vertical rod 21 which extends coaxially inside the helical spring 16, passing through the guide and centering part 17 and through an opening 22 provided in the top end wall of the cylindrical housing 11. The top end of the rod 21 projects above the top end wall of the cylindrical housing 11 and is attached by a kind of hinge to one of the ends of a lever arm 23. For example, this end of the lever arm 23 may be in the form of a fork whose prongs are engaged on either side of the rod 21 in a circular groove between two collars that are fixed to the top end of the rod 21. The other end of the lever 23 is rigidly fixed to one end of an anti-roll bar 24. The bar 24 is rotatably mounted in appropriate bearings 25 carried by brackets 26, themselves fixed to the chassis 1.

Thus, each stabilizing wheel 3A or 3B is associated with a pusher 18, a helical spring 16, a rod 21, and a lever 23, and the two levers are fixed to respective ends of an anti-roll bar 24 as can be seen more particularly in FIG. 1. Instead of being implemented in the form of three separate elements that are fixed to one another, it is possible for the two levers 23 and the anti-roll bar 24 to be implemented in the form of a single bar whose ends are bent, as shown in FIG. 2.

There now follows an explanation of how the above-described system operates to stabilize the cart. When the cart tends to lean to one side in a turn or while on an inclined plane, or under a tilting effect produced by the load it is carrying, the pivot 9 of the stabilizing wheel situated on the side towards which the cart is leaning, e.g. the pivot 9 of the stabilizing wheel 3A, is urged into its cylindrical housing 11, thereby urging the pusher 18 upwards while compressing the helical spring 16 located thereabove, as can be seen in the lefthand portion of FIG. 3. The upwards movement of the pusher 18 associated with the stabilizing wheel 3A is transmitted to the pusher 18 associated with the other stabilizing wheel 3B via the two rods 21 associated with the respective pushers, and via the two levers 23 and the anti-roll bar 24. As a result, the helical spring 16 that is to be found above the stabilizing wheel 3B is compressed. Consequently, the forces of the two helical springs 16 combine to oppose the engagement of the pivot 9 of stabilizing wheel 3A into its cylindrical housing 11. Consequently, the pivot 9 of stabilizing wheel 3A penetrates into its cylindrical housing 11 by an amount that is less than would have been the case with only one spring acting thereon, so the cart leans less.

In addition, under the operating conditions described above, the upwardly-directed traction force that is exerted by the anti-roll bar 24 and by the lever 23 on the rod 21 of the pusher 18 situated above the stabilizing wheel 3B serves to oppose in part or in full the downwardly-directed vertical thrust exerted by the helical spring 16 on the top end of the pivot 9 of stabilizing wheel 3B. As a result, the upwardly-directed vertical thrust exerted by stabilizing wheel 3B on the chassis by reaction on the ground is reduced or even eliminated. This also contributes to increasing stability since the upwardly-directed vertical thrust exerted by the stabilizing wheel 3B on the chassis used to have the effect of accentuating the tendency of the cart to lean towards the wheel 3A.

Since neither of the two pushers 18 is attached to the pivot 9 of the corresponding stabilizing wheel 3A or 3B, it can happen, in operation under the conditions mentioned above, that the pusher 18 separates from the top end of the corresponding pivot 9, e.g. the pivot 9 of the stabilizing wheel 3B in the above-described case, as shown in the righthand portion of FIG. 3. Under such conditions not only is the upwardly-directed vertical thrust of the stabilizing wheel 3B on the chassis of the cart eliminated, thereby contributing to increasing the stability of the cart, as mentioned above, but also the stabilizing wheel 3B is not lifted off the ground by the stabilizing or anti-roll mechanism. Instead of that, as shown in the righthand portion of FIG. 3, the stabilizing wheel 3B remains in contact with the ground, and because the axis of rotation of the wheel is offset from the pivot axis 9, the wheel 3B continues to be steered and thus remain in alignment with the travel direction of the cart. Consequently, it does not run any risk of taking up a position across the travel direction of the cart, and as a result there is no risk of the stabilizing wheel or its mounting components being damaged. In the above description, it has been assumed that the cart was leaning towards stabilizing wheel 3A and that it was the pivot 9 of said wheel 3A that engaged further into its housing 11. Nevertheless, given that the stabilizing mechanism is entirely symmetrical, its operation is entirely similar to that described above in the event of the cart leaning towards stabilizing wheel 3B, in which case it would be the pivot 9 of wheel 3B that engages further into its housing 11.

The groove 14 and the pin 15 associated with the pivot 9 of each of the two stabilizing wheels 3A and 3B serves to limit axial displacement of the pivot 9 within the corresponding housing 11 and makes it possible to avoid the corresponding stabilizing wheel being lost whenever the cart is lifted up. It should be observed that the width of the groove 14, i.e. its dimension in the axial direction of the pivot 9, is preferably at least as large as the maximum vertical displacement allowed for the stabilizing mechanism, so that the pin 15 does not interfere with normal operation of the stabilizing mechanism.

Figure 4:
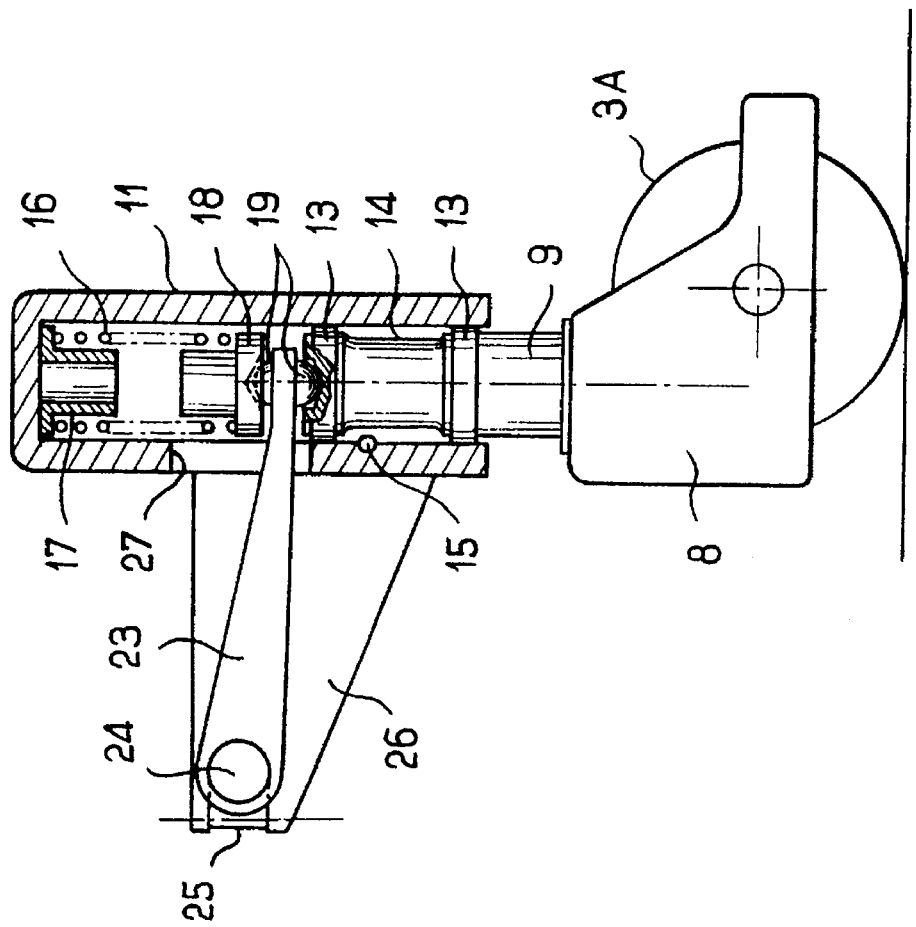
FIG. 4 is a view similar to FIG. 3, but showing only one stabilizing wheel, in a variant embodiment of the invention.

FIG. 4 shows a variant embodiment of the stabilizing mechanism. In FIG. 4, only one of the two stabilizing wheels is shown, e.g. the wheel 3A, it being understood that the stabilizing mechanism elements that are associated with the other stabilizing wheel 3B are identical to those shown in FIG. 4. In this figure, elements which are identical to or perform the same function as elements of the embodiment of FIGS. 1 and 3 are designated by the same reference numerals and they are not described in detail again. The embodiment shown in FIG. 4 differs from the preceding embodiment in that the rod 21 of each pusher 18 is omitted, and each lever 23 acts directly on the top end of the pivot 9 of the corresponding stabilizing wheel 3A or 3B. More precisely, each cylindrical housing 11 includes a vertical slot 27 which extend longitudinally through the cylindrical wall of the housing 11 and through which the lever 23 penetrates into the inside of said housing. The end of the lever 23 which is situated inside the housing 11 is in contact on top with the bottom surface of the pusher 18, and at the bottom with the top surface of the pivot 9 of the stabilizing wheel. An anti-friction element 19 is interposed between the pivot 9 and the lever 23, and between the lever 23 and the pusher 18. The anti-friction element 19 may be constituted by a single ball set in the end of the lever 23, or by two hemispherical projections fixed to the top and bottom faces respectively of the end of the lever 23.

The stabilizing mechanism of FIG. 4 operates in substantially the same manner as that of FIGS. 1 and 3. When the cart leans to one side, e.g. towards stabilizing wheel 3A, the pivot 9 of the wheel 3A engages further into its housing 11 while compressing the spring 16 located thereabove and while also compressing the spring 16 located above the other stabilizing wheel 3B via the two levers 23 and the anti-roll bar 24. Simultaneously, the lever 23 which is situated above the stabilizing wheel 3B tends to move away from the top end of the pivot 9 of the wheel 3B, but the wheel remains in contact with the ground. Under such conditions, and because of its offset relative to the pivot axis 9, the wheel 3 remains in alignment with the travel direction of the cart.

In the embodiments described above, the helical springs 16 extend vertically. Nevertheless, that is not essential for implementing the present invention. FIG. 5 is a diagram showing another embodiment of the invention in which the springs 16 can be disposed horizontally. In this case, one of the ends of each of the springs 16 bears against a vertical abutment surface 28 belonging to the chassis 1 of the cart. The other end of the spring 16 bears against a side of one of the levers 23, which lever extends generally vertically downwards from the anti-roll bar 24 and itself bears via its opposite side against one of the two lever arms of a bell-crank 29. The other lever arm of the bell-crank 29 extends substantially horizontally and carries the housing 11 for the pivot 9 of one of the two stabilizing wheels 3A and 3B. In this case, the pivot 9 is mounted solely to rotate in its housing 11, without having any freedom for axial movement therein. Vertical movement of the stabilizing wheel 3A or 3B is provided in this case because the bell-crank 29 is hinged at its corner angle about an axis 31 which is parallel to the anti-roll bar 24 and supported by an appropriate mount 32 that is fixed to the chassis 1.

With the embodiment of FIG. 5, when the cart leans to one side, reaction from the ground on the stabilizing wheel situated at the side towards which the cart is leaning causes the bell-crank 29 associated with said stabilizing wheel to pivot counterclockwise (as can be seen in FIG. 5) about the axis 31. The bell-crank 29 thus compresses the helical spring 16 that is situated on the same side of the cart as the bell-crank, and also compresses the helical spring 16 situated on the other side of the cart, via the levers 23 and the anti-roll bar 24. Simultaneously, the lever 23 situated on the other side of the cart moves away from the adjacent bell-crank 29 that supports the other stabilizing wheel, so said other wheel remains in contact with the ground.

A retaining or abutment element 33 which is fixed to the chassis 1 serves to restrict downwards vertical displacement of the stabilizing wheel 3A or 3B. Although the abutment 33 is shown in FIG. 5 as being placed on the path of the substantially vertical arm of the bell-crank 29, it could equally well be located on the path of the substantially horizontal arm of the bell-crank 29.

Naturally the embodiments described in detail above are given purely by way of indicative and non-limiting example, and numerous modifications may easily be applied thereto by the person skilled in the art without thereby going beyond the ambit of the invention. This applies in particular to the connection between each lever 23 and the top end of the corresponding rod 21 which may be different from that shown in FIGS. 1 and 3. For example, each lever 23 could be terminated by a finger which is engaged in an eye-hole fixed to the top end of the rod 21. In addition, instead of providing two helical springs 16, one for each stabilizing wheel, it is possible to provide a single helical spring that acts on an additional lever arm that is fixed to the anti-roll bar in a disposition similar to that described in French patent No. 2 667 546. In which case, the single helical spring is preferably chosen so that it provides a force that is equal to twice the force of either of the two springs 16. It is also possible to replace the spring(s) 16 by elements that have a spring-effect, e.g. pads of elastomer material, or pneumatic pads.

I claim:

1. A goods-handling cart comprising; a chassis having a longitudinal midplane and provided with a plurality of wheels enabling it to run on the ground, one of the wheels being a drive and steer wheel and being situated in the longitudinal midplane, two other wheels being swivelling stabilizing wheels situated on respective opposite sides of the drive and steer wheel, stabilizing wheel mounting elements for mounting each stabilizing wheel to pivot about a vertical axis and to move vertically relative to the chassis, a mechanism including two levers and an anti-roll bar interconnecting said levers and at least one spring-effect element acting on both stabilizing wheels via said mechanism for transmitting a downwardly-directed vertical force to said stabilizing wheels, wherein said stabilizing wheels are free from said mechanism and said mechanism bears via contact surfaces against said stabilizing wheel mounting elements such that said mechanism is free to move away from said corresponding stabilizing wheel mounting elements in a direction opposite to the thrust direction of said spring-effect element, and wherein retaining means are associated with each stabilizing wheel to restrict downwards displacement thereof relative to the chassis.

2. A cart according to claim 1, in which each stabilizing wheel is mounted to rotate in a clevis which is itself provided with a vertical pivot, which pivot is slidably and rotatably mounted in a vertical axis cylindrical housing secured to the chassis, wherein the cylindrical housing of the pivot of each stabilizing wheel is at least partially closed in an upwards direction by a top wall, and wherein a spring-effect element is disposed in the cylindrical housing for the pivot of each stabilizing wheel between said top wall of the housing and a pusher which forms a portion of said mechanism and which is vertically movable in said housing.

3. A cart according to claim 2, wherein each pusher bears against the top end of the pivot of the corresponding stabilizing wheel and is provided with a vertical rod which passes through the spring-effect element and through an opening in the top wall of the cylindrical housing, the top end of said rod projecting above said top wall and being attached to one end of one of the two levers of said mechanism.

4. A cart according to claim 2, wherein an anti-friction element is interposed between the pivot of each stabilizing wheel and the pusher associated therewith.

5. A cart according to claim 4, wherein the anti-friction element is a ball housed in part in a recess formed in the top end face of the pivot and in part in a recess formed in the bottom end face of the pusher.

6. A cart according to claim 2, wherein each cylindrical housing comprises a cylindrical wall and a vertical slot which extends longitudinally through the cylindrical wall of said housing, and wherein both levers penetrate into respective ones of the cylindrical housings through the vertical slots thereof, the end of each lever which is situated inside the cylindrical housing being in top contact with a bottom face of the pusher and in bottom contact with a top end face of the pivot of corresponding stabilizing wheel.

7. A cart according to claim 2, wherein said retaining means comprise, for each stabilizing wheel, a circular groove formed in the cylindrical surface of the pivot of the wheel and having a predetermined width that corresponds to the vertical displacement allowed for said stabilizing wheel, together with a pin that projects into the cylindrical housing and that penetrates into said groove of the pivot.

* * * * *